United States Patent
Tojo et al.

(10) Patent No.: US 10,392,505 B2
(45) Date of Patent: Aug. 27, 2019

(54) THERMOPLASTIC POLYESTER RESIN COMPOSITION AND MOLDED ARTICLE

(71) Applicant: TORAY INDUSTRIES, INC., Tokyo (JP)

(72) Inventors: Yusuke Tojo, Nagoya (JP); Makito Yokoe, Nagoya (JP); Hideyuki Umetsu, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/767,323

(22) PCT Filed: Oct. 26, 2016

(86) PCT No.: PCT/JP2016/081743
§ 371 (c)(1),
(2) Date: Apr. 10, 2018

(87) PCT Pub. No.: WO2017/073623
PCT Pub. Date: May 4, 2017

(65) Prior Publication Data
US 2019/0062547 A1    Feb. 28, 2019

(30) Foreign Application Priority Data
Oct. 30, 2015 (JP) ................................. 2015-214371

(51) Int. Cl.
| | |
|---|---|
| *C08L 67/02* | (2006.01) |
| *C08K 3/00* | (2018.01) |
| *C08K 5/053* | (2006.01) |
| *C08K 5/1545* | (2006.01) |
| *C08L 63/00* | (2006.01) |
| *C08L 67/00* | (2006.01) |
| *C08K 5/1515* | (2006.01) |

(52) U.S. Cl.
CPC ............... *C08L 67/02* (2013.01); *C08K 3/00* (2013.01); *C08K 5/053* (2013.01); *C08K 5/1515* (2013.01); *C08K 5/1545* (2013.01); *C08L 63/00* (2013.01); *C08L 67/00* (2013.01); *C08L 2201/02* (2013.01); *C08L 2205/025* (2013.01); *C08L 2205/03* (2013.01)

(58) Field of Classification Search
CPC ........ C08L 67/02; C08K 5/053; C08K 5/1515
See application file for complete search history.

(56) References Cited

U.S. PATENT DOCUMENTS

| | | | |
|---|---|---|---|
| 4,022,752 A | 5/1977 | Horn et al. | |
| 4,141,882 A * | 2/1979 | Kodama | C08K 5/34924 523/435 |
| 4,760,107 A * | 7/1988 | Nelson | C08K 5/053 523/447 |
| 5,681,879 A * | 10/1997 | Yamamoto | C08K 5/0066 524/281 |
| 2012/0077905 A1 | 3/2012 | Chen et al. | |
| 2013/0011613 A1 | 1/2013 | Ota et al. | |

FOREIGN PATENT DOCUMENTS

| | | |
|---|---|---|
| JP | 50-151953 A | 12/1975 |
| JP | 7-188520 A | 7/1995 |
| JP | 8-73711 A | 3/1996 |
| JP | 8-113670 A | 5/1996 |
| JP | 11-124469 A | 5/1999 |
| JP | 2009-173900 A | 8/2009 |
| JP | 2011-52172 A | 3/2011 |
| JP | 2011-529991 A | 12/2011 |
| JP | 2012-507614 A | 3/2012 |
| WO | WO 2010/014801 A1 | 2/2010 |
| WO | WO 2010/051589 A1 | 5/2010 |
| WO | WO 2011/122209 A1 | 10/2011 |

OTHER PUBLICATIONS

Machine translated English language equivalent of JP 07-188520 (1995, 6 pages).*
International Search Report for PCT/JP2016/081743 (PCT/ISA/210) dated Jan. 24, 2017.
Written Opinion of the International Searching Authority for PCT/JP2016/081743 (PCT/ISA/237) dated Jan. 24, 2017.

* cited by examiner

*Primary Examiner* — Brieann R Johnston
(74) *Attorney, Agent, or Firm* — Birch, Stewart, Kolasch & Birch LLP

(57) ABSTRACT

There is provided a thermoplastic polyester resin composition, comprising a specified amount of a multivalent hydroxyl compound (B) having five or more hydroxyl groups and a specified amount of an epoxy compound (C) that are to be blended with a thermoplastic polyester resin (A).

11 Claims, No Drawings

THERMOPLASTIC POLYESTER RESIN COMPOSITION AND MOLDED ARTICLE

TECHNICAL FIELD

The present disclosure relates to a thermoplastic polyester resin composition and a molded article obtained by molding the same.

BACKGROUND

The thermoplastic polyester resin is used in a wide range of fields such as machine mechanism components, electrical and electronic components and automobile components by taking advantage of its characteristics, for example, excellent injection moldability and mechanical properties. The thermoplastic polyester resin is, however, likely to deteriorate the mechanical strength by heat aging at high temperature. For the use as the industrial material for machine mechanism components, electrical and electronic components and automobile components, the thermoplastic polyester resin needs to have long-term heat aging resistance at high temperature, in addition to balance of general chemical characteristics and general physical characteristics. In recent years, there has also been a growing demand for reduction of thickness and weight, accompanied with downsizing of a molded article. Especially, in the application of thin-walled molded articles such as a connector, generation of a large amount of cracked gas from a material in the molding process leads to generation of air bubbles in the molded article and thereby causes molding failures such as reduction of mechanical strength and poor appearance. Accordingly, there is a demand for a material having a small amount of cracked gas generation and excellent molding processability.

In order to improve the thermal stability of the thermoplastic polyester resin, proposed techniques include a thermoplastic resin composition obtained by blending a compound having an isocyanato group and/or carbodiimide group with a polybutylene terephthalate resin (for example, Patent Literature 1) and a thermoplastic resin composition obtained by blending a multivalent alcohol, a reinforcing material and a polymer reinforcing agent with a thermoplastic resin selected from the group consisting of polyamides, polyesters and their mixtures (for example, Patent Literature 2).

These proposed techniques still have problems of insufficient heat aging resistance and mechanical properties and an increased gas generation amount in the molding process.

A thermoplastic resin composition obtained by blending a multivalent hydroxyl compound and an epoxy compound with a polyester resin (for example, Patent Literature 3) has also been proposed.

CITATION LIST

Patent Literature

Patent Literature 1: JP S50-151953A
Patent Literature 2: JP 2011-529991A
Patent Literature 3: JP H07-188520A

SUMMARY

Technical Problem

The thermoplastic resin composition proposed in Patent Literature 3, however, uses a low molecular-weight multivalent alcohol and causes the alcohol component to be volatilized in the melting process. This leads to problems of an increased amount of cracked gas generation and poor moldability. During heat treatment of a molded article, the low molecular-weight multivalent hydroxyl compound migrates to the surface of the molded article. This thermoplastic resin composition accordingly has a high potential of bleed-out. This reduces the concentration of the multivalent hydroxyl compound in the molded article and thereby deteriorates the heat aging resistance.

An object of the disclosure is to provide a thermoplastic polyester resin composition configured to produce a molded article having excellent bleed-out resistance as well as excellent mechanical properties, long-term heat aging resistance and dimensional stability, and to provide such a molded article.

Solution to Problem

After extensive consideration with a view to solving the above problem, the inventors have found that blending a specified amount of a multivalent hydroxyl compound (B) having five or more hydroxyl groups and a specified amount of an epoxy compound (C) with a thermoplastic polyester resin (A) solves the above problem and have achieved the present disclosure. More specifically, the present disclosure may be implemented by the following aspects.

[1] There is provided a thermoplastic polyester resin composition, comprising: 0.1 to 10 parts by weight of a multivalent hydroxyl compound (B) having five or more hydroxyl groups and 0.1 to 10 parts by weight of a multifunctional epoxy compound (C), relative to 100 parts by weight of a thermoplastic polyester resin (A).

The thermoplastic polyester resin composition described in [1] provides a material having good balance of moldability, bleed-out resistance, mechanical properties, heat aging resistance and dimensional stability.

[2] In the thermoplastic polyester resin composition described in [1] above, a ratio of parts by weight of the multivalent hydroxyl compound (B) having five or more hydroxyl groups to parts by weight of the multifunctional epoxy compound (C) ((parts by weight of the multivalent hydroxyl compound (B) having five or more hydroxyl groups relative to 100 parts by weight of the thermoplastic polyester resin (A))/(parts by weight of the multifunctional epoxy group (C) relative to 100 parts by weight of the thermoplastic polyester resin (A))) may be 2 to 5.

The thermoplastic polyester resin composition described in [2] provides a material having better balance of moldability, bleed-out resistance, mechanical properties, heat aging resistance and dimensional stability.

[3] In the thermoplastic polyester resin composition described in either [1] or [2] above, the multivalent hydroxyl compound (B) having five or more hydroxyl groups may be at least one species selected among sugar alcohols, cyclitols, monosaccharides, disaccharides and oligosaccharides.

The thermoplastic polyester resin composition described in [3] provides a material having better balance of moldability, bleed-out resistance, mechanical properties, heat aging resistance and dimensional stability.

[4] In the thermoplastic polyester resin composition described in any of [1] to [3] above, the multivalent hydroxyl compound (B) having five or more hydroxyl groups may be at least one species selected among mannitol, sorbitol, maltitol, lactitol, inositol, oligotose and isomalt.

The thermoplastic polyester resin composition described in [4] provides a material having better balance of moldability, bleed-out resistance, mechanical properties, heat aging resistance and dimensional stability.

[5] In the thermoplastic polyester resin composition described in any of [1] to [4] above, the multivalent hydroxyl compound (B) having five or more hydroxyl groups may be mannitol and/or sorbitol.

The thermoplastic polyester resin composition described in [5] provides a material having better balance of moldability, bleed-out resistance, mechanical properties, heat aging resistance and dimensional stability.

[6] In the thermoplastic polyester resin composition described in any of [1] to [5] above, the multifunctional epoxy compound (C) may be a bisphenol-type epoxy compound and/or a novolac-type epoxy compound.

The thermoplastic polyester resin composition described in [6] provides a material having good balance of moldability, bleed-out resistance and heat aging resistance.

[7] The thermoplastic polyester resin composition described in any of [1] to [6] above may further comprise 1 to 100 parts by weight of an inorganic filler (D) relative to 100 parts by weight of the thermoplastic polyester resin (A).

The thermoplastic polyester resin composition described in [7] provides a material having better balance of mechanical properties and heat aging resistance.

[8] The thermoplastic polyester resin composition described in any of [1] to [7] above may further comprise 1 to 50 parts by weight of a flame retardant (E) relative to 100 parts by weight of the thermoplastic polyester resin (A).

The thermoplastic polyester resin composition described in [8] provides a material having better heat aging resistance and flame retardance.

[9] In the thermoplastic polyester resin composition described in [8] above, the flame retardant (E) may be a halogen flame retardant.

The thermoplastic polyester resin composition described in [9] provides a material having good balance of mechanical strength and flame retardance.

[10] In the thermoplastic polyester resin composition described in any of [1] to [9] above, the thermoplastic polyester resin (A) may be a polybutylene terephthalate resin.

The thermoplastic polyester resin composition described in [10] provides a material having better balance of mechanical properties and heat aging resistance.

[11] There is provided a molded article produced from the thermoplastic polyester resin composition described in any of [1] to [10] above.

[12] In the molded article described in [11] above, a retention rate of tensile strength that is measured with respect to a ⅛ inch (approximately 3.2 mm) of a test piece molded in conformity with ASTM D638 (in 2005) and that is determined according to an expression given below may be not lower than 60%:

(tensile strength after exposure in the atmosphere at temperature of 160° C. for 4000 hours)/(initial tensile strength)×100.

[13] In the molded article described in [11] or [12] above, wherein a retention rate of tensile strength that is measured with respect to a ⅛ inch (approximately 3.2 mm) of a test piece molded in conformity with ASTM D638 (in 2005) and that is determined according to an expression given below may be not lower than 60%:

(tensile strength after exposure in the atmosphere at temperature of 190° C. for 4000 hours)/(initial tensile strength)×100.

Advantageous Effects of Disclosure

The thermoplastic polyester resin composition according to the disclosure advantageously has low gas generation and excellent bleed-out resistance. A molded article having excellent mechanical properties, long-term heat aging resistance and dimensional stability is obtainable by using the thermoplastic polyester resin composition according to the disclosure.

DESCRIPTION OF EMBODIMENTS

The following describes a thermoplastic polyester resin composition according to the disclosure in detail.

The thermoplastic polyester resin composition (hereinafter may be referred to as "resin composition") of the disclosure comprises 0.1 to 10 parts by weight of a multivalent hydroxyl compound (B) having five or more hydroxyl groups and 0.1 to 10 parts by weight of a multifunctional epoxy compound (C), relative to 100 parts by weight of a thermoplastic polyester resin (A). The thermoplastic polyester resin (A) has excellent injection moldability and mechanical properties but is likely to decrease the molecular weight and increase the amount of carboxyl end group due to main chain decomposition by heat aging accompanied with thermal decomposition and oxidative decomposition at high temperature. The mechanical properties of a molded article produced from the resin composition deteriorate in the progress of a decrease in molecular weight by heat aging.

According to the present disclosure, adding the multivalent hydroxyl compound (B) having five or more hydroxyl groups to the thermoplastic polyester resin (A) has advantageous effects described below. The multivalent hydroxyl compound (B) having five or more hydroxyl groups reacts with the carboxyl end group of the thermoplastic polyester resin (A) and thereby suppresses a decrease in molecular weight. The hydroxyl group of the multivalent hydroxyl compound (B) reacts with the carboxyl end group of the thermoplastic polyester resin (A) to produce dense cross-linking. Producing the dense cross-linking reduces the oxygen permeability and thereby improves the heat aging resistance.

Inclusion of the multifunctional epoxy compound (C) causes the multifunctional epoxy compound (C) to react with the multivalent hydroxyl compound (B) having five or more hydroxyl groups. This improves the dispersibility of the multivalent hydroxyl compound (B) having five or more hydroxyl groups in the composition and suppresses volatilization of the multivalent hydroxyl compound (B). This also prevents migration (bleed-out) of the multivalent hydroxyl compound (B) having five or more hydroxyl groups to the surface of a molded article produced from the resin composition during heat treatment and improves the bleed-out resistance. This also accelerates the above reaction of the carboxyl end ground of the thermoplastic polyester resin (A) with the hydroxyl group of the multivalent hydroxyl compound (B) and further improves the heat aging resistance.

The thermoplastic polyester resin composition of the disclosure includes a reactant obtained by reaction of the component (A) with the component (B) and the component (C). This reactant is produced by a complicated reaction, and it is unpractical to identify the structure of the reactant. The present disclosure is accordingly identified by the components to be blended.

The thermoplastic polyester resin (A) used according to the disclosure preferably has a melting point of 180 to 250° C. In terms of maintaining the heat resistance of the molded article, the melting point of the thermoplastic polyester resin (A) is not lower than 180° C. The melting point of the thermoplastic polyester resin (A) is preferably not lower than 190° C. and is more preferably not lower than 200° C.

The melting point of the thermoplastic polyester resin (A) of not higher than 250° C., on the other hand, suppresses thermal decomposition during melt processing by setting a high melt processing temperature. This accordingly suppresses deterioration of the heat aging resistance. The melting point of the thermoplastic polyester resin (A) is preferably not higher than 245° C. and is more preferably not higher than 240° C. The melting point herein denotes a peak top temperature in a single crystal melt peak of the thermoplastic polyester resin (A) measured by a differential scanning calorimeter (DSC).

The thermoplastic polyester resin (A) used according to the disclosure is a polymer or a copolymer having, as its main structural unit, at least one residue selected from the group consisting of (1) a dicarboxylic acid or its ester-forming derivative and a diol or its ester-forming derivative, (2) a hydroxycarboxylic acid or its ester-forming derivative, and (3) lactone. The "main structural unit" means that the content of at least one residue selected from the group consisting of (1) to (3) is not lower than 50 mol % in the entire structural unit. A preferable configuration of the polymer or the copolymer includes not lower than 80 mol % of at least one residue selected from the group consisting of (1) to (3) in the entire structural unit. Among the polymers and the copolymers having, as the main structural unit, at least one residue selected from the group consisting of (1) to (3) in the entire structural unit, preferable is the polymer or the copolymer having the residue of (1) the dicarboxylic acid or its ester-forming derivative and the diol or its ester-forming derivative as the main structural unit, in terms of the excellent mechanical properties and heat resistance.

Examples of the dicarboxylic acid or its ester-forming derivative described above include aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyl ether dicarboxylic acid, 5-tetrabutyl phosphonium isophthalic acid, and sodium 5-sulfoisophthalate; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid and 1,4-cyclohexanedicarboxylic acid; and their ester-forming derivatives. Two or more different species among them may be used as the above dicarboxylic acid or its ester-forming derivative.

Examples of the diol or its ester-forming derivative described above include aliphatic or alicyclic glycols having 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol and dimer diol; long-chain glycols having the molecular weight of 200 to 100,000 such as polyethylene glycol, poly-1,3-propylene glycol and polytetramethylene glycol; aromatic dioxy compounds such as 4,4'-dihydroxybiphenyl, hydroquinone, t-butylhydroquinone, bisphenol A, bisphenol S and bisphenol F; and their ester-forming derivatives. Two or more different species among them may be used as the above diol or its ester-forming derivative.

Examples of the polymer or the copolymer having, as its structural unit, the dicarboxylic acid or its ester-forming derivative and the diol or its ester-forming derivative include aromatic polyester resins such as polypropylene terephthalate, polybutylene terephthalate, polypropylene isophthalate, polybutylene isophthalate, polybutylene naphthalate, polypropylene isophthalate/terephthalate, polybutylene isophthalate/terephthalate, polypropylene terephthalate/naphthalate, polybutylene terephthalate/naphthalate, polybutylene terephthalate/decanedicarboxylate, polypropylene terephthalate/sodium 5-sulfoisophthalate, polybutylene terephthalate/sodium 5-sulfoisophathalate, polypropylene terephthalate/polyethylene glycol, polybutylene terephthalate/polyethylene glycol, polypropylene terephthalate/polytetramethylene glycol, polybutylene terephthalate/polytetramethylene glycol, polypropylene terephthalate/isophthalate/polytetramethylene glycol, polybutylene terephthalate/isophthalate/polytetramethylene glycol, polybutylene terephthalate/succinate, polypropylene terephthalate/adipate, polybutylene terephthalate/adipate, polypropylene terephthalate/sebacate, polybutylene terephthalate/sebacate, polypropylene terephthalate/isophthalate/adipate, polybutylene terephthalate/isophthalate/succinate, polybutylene terephthalate/isophthalate/adipate, and polybutylene terephthalate/isophthalate/sebacate. The symbol "/" herein denotes copolymer.

In terms of further improving the mechanical properties and the heat resistance, among them, more preferable is the polymer or the copolymer having, its main structural unit, the residue of the aromatic dicarboxylic acid or its ester-forming derivative and the residue of the aliphatic diol or its ester-forming derivative. Furthermore preferable is the polymer or the copolymer having, as its main structural unit, the residue of terephthalic acid, naphthalene dicarboxylic acid or its ester-forming derivative and the residue of the aliphatic diol selected between propylene glycol and butanediol or its ester-forming derivative.

Among them, especially preferable are aromatic polyester resins such as polypropylene terephthalate, polybutylene terephthalate, polypropylene naphthalate, polybutylene naphthalate, polypropylene isophthalate/terephthalate, polybutylene isophthalate/terephthalate, polypropylene terephthalate/naphthalate and polybutylene terephthalate/naphthalate. Furthermore preferable are polybutylene terephthalate, polypropylene terephthalate and polybutylene naphthalate. In terms of excellent moldability and crystallinity, polybutylene terephthalate is specifically preferable. Any contents of two or more different species among them may be used.

According to the embodiment, the ratio of terephthalic acid or its ester-forming derivative to the total dicarboxylic acid included in the polymer or the copolymer having, as its main structural unit, the residue of the dicarboxylic acid or its ester-forming derivative and the residue of the diol or its ester-forming derivative is preferably not lower than 30 mol %. The ratio of terephthalic acid or its ester-forming derivative to the total dicarboxylic acid is more preferably not lower than 40 mol %.

According to the disclosure, a liquid crystal polyester resin that expresses anisotropy in melting may be used as the thermoplastic polyester resin (A). The structural unit of the liquid crystal polyester resin may be, for example, aromatic oxycarbonyl unit, aromatic dioxy unit, aromatic and/or aliphatic dicarbonyl unit, alkylene dioxy unit and aromatic iminooxy unit.

The thermoplastic polyester resin (A) used according to the disclosure preferably has a weight-average molecular weight (Mw) in a range of higher than 8,000 and not higher than 500,000, in terms of further improving the mechanical properties. The weight-average molecular weight (Mw) of the thermoplastic polyester resin (A) is more preferably in a range of higher than 8,000 and not higher than 300,000. The weight-average molecular weight (Mw) of the thermoplastic polyester resin (A) is furthermore preferably in a range of higher than 8,000 and not higher than 250,000. According to the disclosure, Mw of the thermoplastic polyester resin (A) denotes a poly(methyl methacrylate) (PMMA) equivalent measured by gel permeation chromatography (GPC) using hexafluoro-2-propanol as the solvent.

The thermoplastic polyester resin (A) used according to the disclosure may be manufactured by a known polycondensation method or ring-opening polymerization method. The manufacturing method may be batch polymerization or continuous polymerization. Transesterification reaction or reaction by direct polymerization may be employed. In terms of the productivity, continuous polymerization is preferable. Direct polymerization is more preferably employed.

When the thermoplastic polyester resin (A) used according to the disclosure is a polymer or a copolymer that mainly consists of a dicarboxylic acid or its ester-forming derivative and a diol or its ester-forming derivative and that is obtained by condensation reaction, the following reaction may be employed for manufacture. More specifically, the thermoplastic polyester resin (A) may be manufactured by esterification reaction or transesterification reaction and subsequently polycondensation reaction of the dicarboxylic acid or its ester-forming derivative and the diol or its ester-forming derivative.

In order to cause the esterification reaction or the transesterification reaction and the polycondensation reaction to proceed effectively, it is preferable to add a polymerization reaction catalyst in these reactions. Concrete examples of the polymerization reaction catalyst include organotitanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, tolyl ester and their mixed esters of titanic acid; tin compounds such as dibutyltin oxide, methylphenyltin oxide, tetraethyltin, hexaethylditin oxide, cyclohexahexylditin oxide, didodecytin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, and alkyl stannoic acid such as methyl stannoic acid, ethyl stannoic acid and butyl stannoic acid; zirconium compounds such as zirconium tetra-n-butoxide; and antimony compounds such as antimony trioxide and antimony acetate. Two or more different species among them may be used as the polymerization reaction catalyst.

Among these polymerization reaction catalysts, organotitanium compounds and tin compounds are preferably used, and tetra-n-butyl ester of titanic acid is more preferably used. The amount of the polymerization reaction catalyst added is preferably in a range of 0.01 to 0.2 parts by weight relative to 100 parts by weight of the thermoplastic polyester resin.

The thermoplastic polyester resin composition of the disclosure includes a multivalent hydroxyl compound (B) having five or more hydroxyl groups to be blended with the thermoplastic polyester resin (A). As described above, the thermoplastic polyester resin is likely to deteriorate by heat aging. Inclusion of the multivalent hydroxyl compound (B) having five or more hydroxyl groups improves the heat aging resistance.

The multivalent hydroxyl compound (B) having five or more hydroxyl groups used according to the disclosure is a compound having five or more hydroxyl groups in one molecule. The multivalent hydroxyl compound (B) having five or more hydroxyl groups used according to the disclosure is not specifically limited but may be a compound having five or more hydroxyl groups among aliphatic multivalent hydroxyl compounds, sugar alcohols, cyclitols, monosaccharides, disaccharides, oligosaccharides and polysaccharides. Two or more different species among them may be used in combination as the multivalent hydroxyl compound (B) having five or more hydroxyl groups.

The aliphatic multivalent hydroxyl compound is a condensate of an aliphatic multivalent alcohol. Among the aliphatic multivalent hydroxyl compounds, concrete examples of the compound having five or more hydroxyl groups include polyglycerol, dipentaerythritol and tripentaerythritol.

The sugar alcohol is a compound obtained by reducing a keto group of a monosaccharide or a disaccharide to a hydroxyl group. Among the sugar alcohols, concrete examples of the compound having five or more hydroxyl groups include xylitol, mannitol, sorbitol, maltitol, lactitol and isomalt.

The cyclitol is a cycloalkane containing a hydroxyl group on each of three or more ring atoms. Among the cyclitols, a concrete example of the compound having five or more hydroxyl groups is inositol.

Among the monosaccharides, concrete examples of the compound having five or more hydroxyl groups include glucose, fructose, and galactose.

Among the disaccharides, concrete examples of the compound having five or more hydroxyl groups include lactose, maltose, and sucrose.

Among the oligosaccharides, concrete examples of the compound having five or more hydroxyl groups include maltotriose, isomalto-oligosaccharide, fructo-oligosaccharide, galacto-oligosaccharide, xylo-oligosaccharide, soybean oligosaccharide, α-cyclodextrin, β-cyclodextrin and γ-cyclodextrin.

Among the polysaccharides, concrete examples of the compound having five or more hydroxyl groups include starch, cellulose, locust bean gum, guar gum and tamarind seed gum.

The multivalent hydroxyl compound (B) having five or more hydroxyl groups is preferably a sugar alcohol, a cyclitol, a monosaccharide, a disaccharide, an oligosaccharide or a polysaccharide, in terms of the relatively high compatibility with resins and suppression of the bleed-out. Among them, more preferable are mannitol, sorbitol, maltitol, lactitol, inositol, oligotose and isomalt. Among these, furthermore preferable are mannitol and sorbitol since they further improve the heat aging resistance.

The amount of the multivalent hydroxyl compound (B) having five or more hydroxyl groups is 0.1 to 10 parts by weight relative to 100 parts by weight of the thermoplastic polyester resin (A). The amount of the multivalent hydroxyl compound (B) having five or more hydroxyl groups of lower than 0.1 parts by weight does not give the effect of improving the heat aging resistance. The amount of the multivalent hydroxyl compound (B) having five or more hydroxyl groups is more preferably not lower than 0.5 parts by weight and is furthermore preferably not lower than 1.0 part by weight. The amount of the multivalent hydroxyl compound (B) having five or more hydroxyl groups of higher than 10 parts by weight is, on the other hand, likely to deteriorate the mechanical properties. The amount of the multivalent hydroxyl compound (B) having five or more hydroxyl groups is more preferably not higher than 7.0 parts by weight and is furthermore preferably not higher than 5.0 parts by weight.

The thermoplastic polyester resin composition of the disclosure additionally includes a multifunctional epoxy compound (C) to be blended with the thermoplastic polyester resin (A). As described above, the thermoplastic polyester resin composition including the multivalent hydroxyl compound (B) is likely to bleed out, due to self-aggregation of the multivalent hydroxyl compound (B) having five or more hydroxyl groups, due to hydrogen bonding of the hydroxyl groups of the multivalent hydroxyl compound during heat treatment. Inclusion of the multifunctional epoxy compound (C), however, improves the heat aging resistance, while suppressing the bleed-out. When the multivalent hydroxyl compound (B) having five or more hydroxy groups is coarsely dispersed in the resin composition, the (B) component phase is stretched in the flow direction during the melting process to give the anisotropy in shrinking factor. Inclusion the multifunctional epoxy compound (C) improves the dispersibility of the multivalent hydroxyl compound (B) having five or more hydroxyl groups in the resin composition. This also reduces the anisotropy in flow direction in the molding process and improves the dimensional stability of a molded article.

The multifunctional epoxy compound (C) used according to the disclosure may be a liquid compound or a solid compound including two or more epoxy groups in a molecule and having an epoxy equivalent of not higher than 5000 g/eq. Examples of the multifunctional epoxy compound (C) include copolymers of an α-olefin such as ethylene, propylene or 1-butene and an α, β-unsaturated acid glycidyl ester such as glycidyl acrylate, glycidyl methacrylate and glycidyl ethacrylate; epoxy group-containing polymer compounds obtained by epoxidation of a double bond of an unsaturated double-bonded polymer; bisphenol-glycidyl ether epoxy compounds such as bisphenol A, resorcinol, hydroquinone, pyrocatechol, bisphenol F, saligenin, 1,3,5-trihydroxybenzene, bisphenol S, trihydroxy-diphenyl dimethyl methane, 4,4'-dihydroxybiphenyl, 1,5-dihydroxynaphthalene, cashew phenol, 2,2,5,5-tetrakis(4-hydroxyphenyl)hexane; glycidyl ester epoxy compounds such as glycidyl phthalate; glycidyl amine epoxy compounds such as N-glycidyl aniline; and novolac-type epoxy compounds obtained by reaction of epichlorohydrin with a novolac-type phenolic resin, a dicyclopentadiene-added novolac-type phenolic resin or a diphenyldimethylene-added novolac-type phenolic resin. Two or more different species among them may be used in combination as the multifunctional epoxy compound (C). Among them, the bisphenol A-glycidyl ether epoxy compounds and the novolac-type epoxy compounds are preferable, since they have high heat resistance and suppress thermal decomposition of the epoxy compound during the melting process.

The amount of the multifunctional epoxy compound (C) is 0.1 to 10 parts by weight relative to 100 parts by weight of the thermoplastic polyester resin (A). The amount of the multifunctional epoxy compound (C) of lower than 0.1 parts by weight does not give the effect of improving the heat aging resistance. The amount of the multifunctional epoxy compound (C) is more preferably not lower than 0.5 parts by weight and is furthermore preferably not lower than 1.0 part by weight relative to 100 parts by weight of the thermoplastic polyester resin (A). The amount of the multifunctional epoxy compound (C) of higher than 10 parts by weight is, on the other hand, likely to deteriorate the mechanical properties. The amount of the multifunctional epoxy compound (C) is more preferably not higher than 5.0 parts by weight and is furthermore preferably not higher than 3.0 parts by weight relative to 100 parts by weight of the thermoplastic polyester resin (A).

According to the disclosure, the preferable range of the amount of the multifunctional epoxy compound (C) may be set according to the amount of the multivalent hydroxyl compound (B) having five or more hydroxyl groups. For example, in production of the thermoplastic polyester resin composition, a ratio of parts by weight of the multivalent hydroxyl compound (B) to parts by weight of the multifunctional epoxy compound (C) ((parts by weight of the multivalent hydroxyl compound (B) having five or more hydroxyl groups relative to 100 parts by weight of the thermoplastic polyester resin (A))/(parts by weight of the multifunctional epoxy group (C) relative to 100 parts by weight of the thermoplastic polyester resin (A))) is preferably 1 to 5. The ratio ((parts by weight of the multivalent hydroxyl compound (B) having five or more hydroxyl groups relative to 100 parts by weight of the thermoplastic polyester resin (A))/(parts by weight of the multifunctional epoxy group (C) relative to 100 parts by weight of the thermoplastic polyester resin (A))) of not lower than 1 further improves the heat aging resistance. The ratio of the parts by weight of the multivalent hydroxyl compound (B) to the parts by weight of the multifunctional epoxy compound (C) is more preferably not lower than 2. The ratio ((parts by weight of the multivalent hydroxyl compound (B) having five or more hydroxyl groups relative to 100 parts by weight of the thermoplastic polyester resin (A))/(parts by weight of the multifunctional epoxy group (C) relative to 100 parts by weight of the thermoplastic polyester resin (A))) of not higher than 5, on the other hand, achieves all the higher bleed-out resistance, the higher heat resistance and the better mechanical properties. The ratio of the parts by weight of the multivalent hydroxyl compound (B) to the parts by weight of the multifunctional epoxy compound (C) is preferably not higher than 4 and is more preferably not higher than 3.

It is preferable that the resin composition of the disclosure further contains an inorganic filler (D). Containing the inorganic filler (D) further improves the mechanical properties and the heat aging resistance. The content of the inorganic filler (D) is preferably 1 to 100 parts by weight relative to 100 parts by weight of the thermoplastic polyester resin (A), in terms of the mechanical strength and the heat aging resistance.

Concrete examples of the inorganic filler are fiber reinforcing materials such as glass fibers, aramid fibers and carbon fibers. Chopped strand type glass fibers and roving type glass fibers are preferably used as the above glass fiber. These glass fibers are preferably treated with a silane coupling agent and/or a sizing agent. For example, aminosilane compounds and epoxysilane compounds are preferable as the silane coupling agent. For example, urethane resin, copolymers of acrylic acid such as acrylic acid/styrene copolymer, copolymers of maleic anhydride such as methyl acrylate/methyl methacrylate/maleic anhydride copolymer, vinyl acetate resin and one or more epoxy compounds such as bisphenol A diglycidyl ether and novolac type epoxy compound are preferably used as the sizing agent. The silane coupling agent and/or the sizing agent may be mixed in an emulsion in use. The fiber diameter is generally preferably not less than 1 μm and is more preferably not less than 5 μm. The fiber diameter is also preferably not greater than 30 μm and is more preferably not greater than 15 μm. The fiber sectional shape is generally a circular shape, but the fiber reinforcing material having any sectional shape may be used, for example, elliptical glass fiber having any aspect ratio, flat glass fiber and cocoon-shaped glass fiber. The fiber reinforcing material having any sectional shape improves the flowability in the injection molding process and provides a molded article of less warpage.

The content of the fiber reinforcing material is preferably not lower than 1 part by weight and is more preferably not lower than 3 parts by weight relative to 100 parts by weight of the thermoplastic polyester resin (A). The content of the fiber reinforcing material is also preferably not higher than 100 parts by weight and is more preferably not higher than 95 parts by weight relative to 100 parts by weight of the thermoplastic polyester resin (A).

The inorganic filler (D) preferably used for the thermoplastic polyester resin composition of the disclosure may contain an inorganic filler other than the fiber reinforcing material. Containing the inorganic filler other than the fiber reinforcing material improves part of the crystallization property, the arc resistance, the anisotropy, the mechanical strength, the flame retardance and the heat distortion temperature of a molded article. Containing the inorganic filler other than the fiber reinforcing material especially has the effect on anisotropy and thereby provides a molded article of less warpage.

The inorganic filler other than the fiber reinforcing material described above may be a needle-like, granular, powdery or layered inorganic filler. Concrete examples include glass beads, milled fibers, glass flakes, potassium titanate whiskers, calcium sulfate whiskers, wollastonite, silica, kaolin, talc, calcium carbonate, zinc oxide, magnesium oxide, aluminum oxide, mixture of magnesium oxide and aluminum oxide, fine powder silicic acid, aluminum silicate, silicon oxide, smectite-based clay mineral (montmorillonite, hectorite), vermiculite, mica, fluorine taeniolite, zirconium phosphate, titanium phosphate and dolomite. Two or more different species among them may be used in combination as the inorganic filler other than the fiber reinforcing material described above. Using milled fiber, glass flake, kaolin, talc or mica has the effect on anisotropy and thereby provides a molded article of less warpage. Adding calcium carbonate, zinc oxide, magnesium oxide, aluminum oxide, mixture of magnesium oxide and aluminum oxide, fine powder silicic acid, aluminum silicate or silicon oxide in the range of 0.01 to 1 part by weight relative to 100 parts by weight of the thermoplastic polyester resin (A) further improves the melt stability.

The inorganic filler other than the fiber reinforcing material described above may be processed by surface treatment, for example, treatment with a coupling agent, treatment with an epoxy compound or ionization treatment. The average particle diameter of the granular, powdery or layered inorganic filler is preferably not less than 0.1 μm and is more preferably not less than 0.2 μm, in terms of the impact strength. The average particle diameter of the granular, powdery or layered inorganic filler is also preferably not greater than 20 μm and is more preferably not greater than 10 μm. The sum of the content of the inorganic filler other than the fiber reinforcing material and the content of the fiber reinforcing material is preferably not higher than 100 parts by weight relative to 100 parts by weight of the thermoplastic polyester resin (A), in terms of the flowability in the molding process and the durability of a molding machine and a mold. The content of the inorganic filler other than the fiber reinforcing material is preferably 1 to 50 parts by weight relative to 100 parts by weight of the thermoplastic polyester resin (A).

It is preferable that the thermoplastic polyester resin composition of the disclosure further includes a flame retardant (E). The flame retardant (E) is preferably, a halogen flame retardant, an inorganic flame retardant, a phosphorous flame retardant, a salt of a triazine compound and cyanuric acid or isocyanuric acid, or a silicone flame retardant. Two or more different species among them may be used in combination as the flame retardant (E). Inclusion of the flame retardant (E) accelerates the reaction of the thermoplastic polyester resin (A) with the multivalent hydroxyl compound (B), while suppressing thermal decomposition at high temperature. As a result, this further improves the heat aging resistance and provides the flame retardance in the thermoplastic polyester resin composition.

The amount of the flame retardant (E) is preferably not lower than 1 part by weight and is more preferably not lower than 2 parts by weight relative to 100 parts by weight of the thermoplastic polyester resin (A), in terms of the mechanical properties and suppression of the bleed-out. The amount of the flame retardant (E) is also preferably not higher than 50 parts by weight and is more preferably not higher than 40 parts by weight relative to 100 parts by weight of the thermoplastic polyester resin (A).

Concrete examples of the above halogen flame retardant include decabromodiphenyl oxide, octabromodiphenyl oxide, tetrabromodiphenyl oxide, tetrabromophthalic anhydride, hexabromocyclododecane, bis(2,4,6-tribromophenoxy)ethane, ethylenebistetrabromophthalimide, hexabromobenzene, 1,1-sulfonyl[3,5-dibromo-4-(2,3-dibromopropoxy)]benzene, polydibromophenylene oxide, tetrabromobisphenol S, tris(2,3-dibromopropyl-1) isocyanurate, tribromophenol, tribromophenyl allyl ether, tribromoneopentyl alcohol, brominated polystyrene, brominated polyethylene, tetrabromobisphenol A, tetrabromobisphenol A derivative, tetrabromobisphenol A-epoxy polymer, tetrabromobisphenol A-carbonate oligomer, tetrabromobisphenol A-carbonate polymer, tetrabromobisphenol A-bis(2-hydroxydiethyl ether), tetrabromobisphenol A-bis(2,3-dibromopropyl ether), tetrabromobisphenol A-bis(allyl ether), tetrabromocyclooctane, ethylene bispentabromodiphenyl, tris(tribromoneopentyl) phosphate, poly(pentabromobenzyl acrylate), octabromotrimethyl phenylindane, dibromoneopentyl glycol, pentabromobenzyl polyacrylate, dibromocresyl glycidyl ether and N, N'-ethylene-bis-tetrabromophthalimide. Among them, tetrabromobisphenol A-epoxy polymer, tetrabromobisphenol A-carbonate oligomer, tetrabromobisphenol A-carbonate polymer, brominated epoxy resin, brominated polyethylene, pentabromobenzyl polyacrylate, and ethylene bispentabromodiphenyl are preferably used.

Concrete examples of the above inorganic flame retardant include magnesium hydroxide hydrate, aluminum hydroxide hydrate, antimony trioxide, antimony pentoxide, sodium antimonate, zinc hydroxystannate, zinc stannate, meta-stannic acid, tin oxide, tin oxide salt, zinc sulfate, zinc oxide, zinc borate, zinc borate hydrate, zinc hydroxide, iron (II) oxide, iron (III) oxide, sulfur sulfide, tin (II) oxide, tin(IV) oxide, ammonium borate, ammonium octamolybdate, metal tungstate, composite oxide acid of tungsten and metalloid, ammonium sulfamate, zirconium compounds, graphite and swellable graphite.

The inorganic flame retardant may be processed by surface treatment with a fatty acid or a silane coupling agent. Among the above inorganic flame retardants, antimony trioxide, antimony pentoxide and sodium antimonate are especially preferably used, since they improve the flame retardance by the synergistic effect with the halogen flame retardant.

Examples of the above phosphorous flame retardant include aromatic phosphate compounds, phosphazene compounds, phosphaphenanthrene compounds, metal phosphinates, ammonium polyphosphate, melamine polyphosphate, phosphate ester amide and red phosphorus. Among them, aromatic phosphate compounds, phosphazene compounds, phosphaphenanthrene compounds and metal phosphinates are preferably used.

Examples of the above aromatic phosphate compound include resorcinol diphenyl phosphate, hydroquinone diphenyl phosphate, bisphenol A diphenyl phosphate and biphenyl diphenyl phosphate. Commercially available products of the aromatic phosphate compound include, for example, PX-202, CR-741, PX-200 and PX-201 manufactured by DAIHACHI CHEMICAL INDUSTRY CO., LTD. and FP-500, FP-600, FP-700 AND PFR manufactured by ADEKA CORPORATION.

Examples of the above phosphazene compound include phosphonitrilic linear polymer and/or cyclic polymer. A straight-chain polymer mainly consisting of phenoxy phosphazene is especially preferably used as the above phosphazene compound. The phosphazene compound may be synthesized by a known method described in, for example, "Synthesis and Application of Phosphazene Compounds" authored by Kajiwara. For example, a substance may be obtained by reaction of phosphorous pentachloride or phosphorus trichloride as the phosphorous source with ammonium chloride or ammonia gas as the nitrogen source by a known method (cyclic substance may be purified), and the obtained substance may be substituted with an alcohol, a phenol or an amine. For example, Rabitle (registered trademark) FP-110 manufactured by Fushimi pharmaceutical Co., Ltd. and SPB-100 manufactured by Otsuka Chemical Co., Ltd. are preferably used commercially available products.

The above phosphaphenanthrene compound is a phosphorous flame retardant having at least one phosphaphenanthrene skeleton in a molecule. Commercially available products of the phosphaphenanthrene compound include, for example, HCA, HCA-HQ, BCA, SANKO-220 and M-Ester manufactured by SANKO CO., LTD. Especially M-Ester is preferably used, since a reaction of a hydroxyl group at a terminal of M-Ester and a terminal of the thermoplastic polyester resin (A) is expected in the melt kneading process and M-Ester has the effect on suppression of the bleed-out in hot and humid conditions.

The above metal phosphinate is a phosphinate and/or a diphosphinate and/or its polymer and is a useful compound as the flame retardant of the thermoplastic polyester resin (A). Examples of the metal in the metal phosphinate include calcium, aluminum and zinc. Commercially available products of the metal phosphinate include, for example, "Exolit" (registered trademark) OP1230 and OP1240 manufactured by Clariant Japan KK.

The above phosphate ester amide is an aromatic amide flame retardant including phosphorous atom and nitrogen atom. The phosphate ester amide is a substance that has a high melting point and that is in the powder form at ordinary temperature, and accordingly has the excellent handling property in the blending process. The phosphate ester amide further improves the heat distortion temperature of a molded article. For example, SP-703 manufactured by SHIKOKU CHEMICALS CORPORATION is a preferably used commercially available product.

Examples of the above ammonium polyphosphate include ammonium polyphosphate, ammonium melamine-modified polyphosphate and ammonium carbamyl polyphosphate. The ammonium polyphosphate may be coated with a thermosetting resin having thermosetting property, such as a phenolic resin, a urethane resin, a melamine resin, an urea-formaldehyde resin, an epoxy resin or an urea-formaldehyde resin.

Examples of the above melamine polyphosphate include melamine phosphate, melamine pyrophosphate, and melamine polyphosphate that are phosphate of melamine-melam-melem. For example, MPP-A manufactured by Sanwa Chemical Co., Ltd. and PMP-100 and PMP-200 manufactured by Nissan Chemical Industries, Ltd. are preferably used commercially available products of the melamine polyphosphate.

The above red phosphorus is preferably treated by compound coating, for example, thermosetting resin coating, metal hydroxide coating or metal plating coating. For example, a phenol-formalin resin, an urea-formalin resin, a melamine-formalin resin or an alkyd resin may be used as a thermosetting resin in thermosetting resin coating. For example, aluminum hydroxide, magnesium hydroxide, zinc hydroxide or titanium hydroxide may be used as a metal hydroxide in metal hydroxide coating. For example, Fe, Ni, Co, Cu, Zn, Mn, Ti, Zr, Al or any of these alloys may be used as a metal in metal plating coating. Two or more different types of coating may be used in combination, or coating may be two or more layers.

Melamine cyanurate and melamine isocyanurate are preferably used as the above salt of a triazine compound and cyanuric acid or isocyanuric acid. The salt is generally a 1:1 (molar ratio) salt of a triazine compound and cyanuric acid or isocyanuric acid but may be a 1:2 (molar ratio) salt in some cases. Inclusion of this compound has the cooling effect and thereby further improves the flame retardance of the resin composition and a molded article.

Melamine cyanurate or melamine isocyanurate may be manufactured by any method. For example, an aqueous slurry of a mixture of melamine and cyanuric acid or isocyanuric acid is blended well, and a salt of melamine and cyanuric acid or isocyanuric acid is formed as fine particles. The slurry is then filtrated and dried, so that melamine cyanurate or melamine isocyanurate is obtained generally in the powder form. This salt may not be necessarily completely pure but may contain a slight amount of unreacted melamine or cyanuric acid or isocyanuric acid. The salt may be treated with a dispersing agent, for example, tris(β-hydroxyethyl) isocyanurate or with a known surface treatment agent, for example, polyvinyl alcohol or a metal oxide such as silica. The dispersing agent and the surface treatment agent improve the dispersibility. In terms of the flame retardance, the mechanical strength and the surface property of a molded article, the average particle diameters of melamine cyanurate or melamine isocyanurate before and after addition to the resin are both preferably not less than 0.1 μm and are more preferably not less than 0.3 μm. The average particle diameters of melamine cyanurate or melamine isocyanurate before and after addition to the resin are also both preferably not greater than 100 μm and are more preferably not greater than 10 μm. The average particle diameter herein denotes an average particle size measured as a particle size distribution D50 with a laser micron sizer. For example, MC-4000, MC-4500 and MC-6000 manufactured by Nissan Chemical Industries, Ltd. are preferably used commercially available products of the salt of a triazine compound and cyanuric acid or isocyanuric acid.

Examples of the above silicone flame retardant include silicone resin and silicone oil. This silicone resin may be, for example, a resin of a three-dimensional network structure formed by combination of the structural units of $SiO_2$, $RSiO_{3/2}$, $R_2SiO$ and $R_3SiO_{1/2}$. R herein denotes an alkyl group or an aromatic hydrocarbon group that may be substituted. Examples of the alkyl group include methyl group, ethyl group and propyl group. Examples of the aromatic hydrocarbon group include phenyl group and benzyl group. The substituent may be, for example, a vinyl group.

The above silicone oil may be, for example, polydimethylsiloxane or modified polysiloxane obtained by modifying at least one methyl group in a side chain or at a terminal of polydimethylsiloxane with at least one group selected from the group consisting of hydrogen atom, alkyl group, cyclohexyl group, phenyl group, benzyl group, amino group, epoxy group, polyether group, carboxyl group, mercapto group, chloroalkyl group, alkyl higher alcohol ester group, alcohol group, aralkyl group, vinyl group and trifluoromethyl group.

The flame retardant (E) preferably contains a halogen flame retardant, since this provides a molded article having good balance of mechanical strength and flame retardance.

The resin composition of the disclosure may include one or more different types of additives, for example, an ultraviolet absorber, a light stabilizer, a plasticizer and an antistatic agent in a range that does not damage the purpose of the present disclosure.

The resin composition of the disclosure may include a thermoplastic resin other than the component (A) in a range that does not damage the purpose of the present disclosure, in order to improve the moldability, the dimensional stability, the molding shrinkage and the toughness. The thermoplastic resin other than the component (A) may be, for example, an olefin resin, a vinyl resin, a polyamide resin, a polyacetal resin, a polyurethane resin, an aromatic or aliphatic polyketone resin, a polyphenylene sulfide resin, a polyether ether ketone resin, a polyimide resin, a thermoplastic starch resin, a polyurethane resin, an aromatic polycarbonate resin, a polyarylate resin, a polysulfone resin, a polyether sulfone resin, a phenoxy resin, a polyphenylene ether resin, poly(4-methyl-1-pentene), a polyether imide resin, a cellulose acetate resin, a polyvinyl alcohol resin or a thermoplastic polyester resin that does not have a melting point in a range of 180 to 250° C. Concrete examples of the olefin resin include vinyl (co) polymers such as ethylene/propylene copolymer, ethylene/propylene/unconjugated diene copolymer, ethylene/1-butene copolymer, ethylene/glycidyl methacrylate copolymer, ethylene/1-butene/maleic anhydride copolymer, ethylene/propylene/maleic anhydride copolymer and ethylene/maleic anhydride copolymer. Concrete examples of the vinyl resin include methyl methacrylate/styrene resin (MS resin), methyl methacrylate/acrylonitrile resin, polystyrene resin, acrylonitrile/styrene resin (AS resin), styrene/butadiene resin, styrene/N-phenylmaleimide resin, styrene/acrylonitrile/N-phenylmaleimide resin; styrene resins modified with rubber polymer, such as acrylonitrile/butadiene/styrene resin (ABS resin), acrylonitrile/butadiene/methyl methacrylate/styrene resin (MABS resin) and high impact polystyrene resin; block copolymers such as styrene/butadiene/styrene resin, styrene/isoprene/styrene resin, and styrene/ethylene/butadiene/styrene resin; and core shell rubbers such as multi-layered structure of dimethyl siloxane/butyl acrylate polymer (core layer) and methyl methacrylate polymer (shell layer), multi-layered structure of dimethyl siloxane/butyl acrylate polymer (core layer) and acrylonitrile/styrene copolymer (shell layer), multi-layered structure of butadiene/styrene polymer (core layer) and methyl methacrylate polymer (shell layer) and multi-layered structure of butadiene/styrene polymer (core layer) and acrylonitrile/styrene copolymer (shell layer).

The resin composition of the disclosure may include a polyol compound having three or four functional groups and including one or more alkylene oxide unit (hereinafter may be referred to as "polyol compound"). Inclusion of this compound improves the flowability of the resin composition in the molding process, for example, injection molding. The polyol compound may be a low-molecular compound or may be a polymer. Examples of the functional group include a hydroxyl group, an aldehyde group, a carboxylate group, a sulfo group, an amino group, a glycidyl group, an isocyanate group, a carbodiimide group, an oxazoline group, an oxazine group, an ester group, an amide group, a silanol group and a silyl ether group. It is preferable that the polyol compound has three or four identical or different functional groups among them. It is more preferable that the polyol compound has three or four identical functional groups, in terms of further improving the flowability, the mechanical properties, the durability, the heat resistance and the productivity.

A preferable example of the alkylene oxide unit is an aliphatic alkylene oxide unit having one to four carbon atoms. Concrete examples include a methylene oxide unit, an ethylene oxide unit, a trimethylene oxide unit, a propylene oxide unit, a tetramethylene oxide unit, a 1,2-butylene oxide unit, a 2,3-butylene oxide unit and an isobutylene oxide unit.

According to the disclosure, it is preferable to use a compound including an ethylene oxide unit or a propylene oxide unit as the alkylene oxide unit, in terms of the better flowability, recycling efficiency, durability, heat resistance and mechanical properties. It is preferable to use a compound including a propylene oxide unit, in terms of the better long-term hydrolysis resistance and toughness (tensile elongation at break). In terms of the better flowability, the number of the alkylene oxide units is preferably not less than 0.1, is more preferably not less than 0.5 and is furthermore preferably not less than 1 as the alkylene oxide unit per one functional group. In terms of the better mechanical properties, on the other hand, the number of the alkylene oxide units is preferably not greater than 20, is more preferably not greater than 10 and is furthermore preferably not greater than 5 as the alkylene oxide unit per one functional group.

The polyol compound may react with the thermoplastic polyester resin (A) to be introduced into a main chain and/or a side chain of the component (A) or may not react with the thermoplastic polyester resin (A) to maintain its structure at the time of blending in the resin composition.

According to the disclosure, the amount of the polyol compound added is preferably not lower than 0.01 parts by weight and is more preferably not lower than 0.1 parts by weight relative to 100 parts by weight of the thermoplastic polyester resin (A). The amount of the polyol compound added is also preferably not higher than 3 parts by weight and is more preferably not higher than 1.5 parts by weight relative to 100 parts by weight of the thermoplastic polyester resin (A).

The resin composition of the disclosure may include a fluororesin. Inclusion of the fluororesin suppresses melt drop during combustion and improves the flame retardance.

The above fluororesin denotes a resin containing fluorine in a molecule. Concrete examples of the fluororesin include polytetrafluoroethylene, polyhexafluoropropylene, (tetrafluoroethylene/hexafluoropropylene) copolymer, (tetrafluoroethylene/perfluoroalkyl vinyl ether) copolymer, (tetrafluoroethylene/ethylene) copolymer, (hexafluoropropylene/propylene) copolymer, polyvinylidene fluoride and (vinylidene fluoride/ethylene) copolymer.

Among them, polytetrafluoroethylene, (tetrafluoroethylene/perfluoroalkyl vinyl ether) copolymer, (tetrafluoroethylene/hexafluoropropylene) copolymer, (tetrafluoroethylene/ethylene) copolymer, and polyvinylidene fluoride are preferable, and polytetrafluoroethylene and (tetrafluoroethylene/ethylene) copolymer are especially preferable.

The amount of the fluororesin is preferably not lower than 0.05 parts by weight and is more preferably not lower than 0.15 parts by weight relative to 100 parts by weight of the thermoplastic polyester resin (A). The amount of the fluororesin is also preferably not higher than 3 parts by weight and is more preferably not higher than 1.5 parts by weight relative to 100 parts by weight of the thermoplastic polyester resin (A).

The resin composition of the disclosure may include a mold release agent. Inclusion of the mold release agent improves the mold release characteristics of the resin composition in the injection molding process. The mold release agent used may be a known mold release agent for plastics, for example, a fatty acid amide such as ethylene bis(stearamide), a fatty acid amide of a polycondensate of ethylene diamine, stearic acid and sebacic acid or a polycondensate of phenylene diamine, stearic acid and sebacic acid, polyalkylene wax, acid anhydride-modified polyalkylene wax, or a mixture of a fluororesin or a fluorine compound with the above lubricant.

The amount of the mold release agent is preferably not lower than 0.01 parts by weight and is more preferably not lower than 0.03 parts by weight relative to 100 parts by weight of the thermoplastic polyester resin (A). The amount of the mold release agent is also preferably not higher than 1 part by weight and is more preferably not higher than 0.6 parts by weight relative to 100 parts by weight of the thermoplastic polyester resin (A).

The resin composition of the disclosure may further include one or more pigments and dyes among carbon black, titanium oxide and pigments and dyes of various colors. The pigment and the dye tones the color of the resin composition to any of various colors and improves the weather (light) resistance and electrical conductivity of the resin composition. The carbon black used may be, for example, channel black, furnace black, acetylene black, anthracene black, lamp black, turpentine soot and graphite. The carbon black preferably used is carbon black having the average particle size of not greater than 500 nm and having the dibutyl phthalate oil absorption of 50 to 400 $cm^3$/100 g. The titanium oxide preferably used is titanium oxide having a crystal force such as rutile form or anatase form and having the average particle size of not greater than 5 μm.

Any of the carbon black, titanium oxide and pigments and dyes of various colors may be treated with, for example, aluminum oxide, silicon oxide, zinc oxide, zirconium oxide, a polyol or a silane coupling agent. In order to improve the dispersibility in the resin composition of the disclosure and improve the handling property during manufacture, any of these pigments and dyes may be used as a mixed material obtained by melt-blending or simply blending with any of various thermoplastic resins.

The amount of the pigment or the dye is preferably not lower than 0.01 parts by weight and is more preferably not lower than 0.03 parts by weight relative to 100 parts by weight of the thermoplastic polyester resin (A). The amount of the pigment or the dye is also preferably not higher than 3 parts by weight and is more preferably not higher than 1 part by weight relative to 100 parts by weight of the thermoplastic polyester resin (A).

The thermoplastic polyester resin composition of the disclosure may be obtained by, for example, melt kneading the components (A) to (C) described above and other components as needed basis.

A method employed for melt kneading may be, for example, a procedure of preliminarily blending the thermoplastic polyester resin (A), the multivalent hydroxyl compound (B) having five or more hydroxyl groups and the multifunctional epoxy compound (C), and additionally the inorganic filler (D), the flame retardant (E) and various additives as needed basis and feeding the mixture to an extruder or the like to be sufficiently melt-kneaded or a procedure of feeding predetermined amounts of the respective components to an extruder or the like by using a constant feeder such as a weight feeder to be sufficiently melt-kneaded.

A method employed for the above preliminary blending may be, for example, a dry blending method or a blending method using a mechanical mixing machine such as a tumbler mixer, a ribbon mixer or a Henschel mixer. The fiber reinforcing material and the inorganic filler other than the fiber reinforcing material may be added using a side feeder placed in the middle of a breech-loading part of a multi-screw extruder such as a twin screw extruder and a vent. In the case of a liquid additive, an employable method may be, for example, a method of adding the liquid additive using a plunger pump with a liquid addition nozzle placed in the middle of a breech-loading part of a multi-screw extruder such as a twin screw extruder or a method of supplying the liquid additive from a breech-loading part or the like using a metering pump.

It is preferable to mold and form the thermoplastic polyester resin composition of the disclosure after pelletization. A method employed for pelletization may be, for example, a procedure of ejecting the resin composition into strands using, for example, a single screw extruder equipped with a "Uni-melt" type screw or a "Dulmage" type screw, a twin screw extruder, a three screw extruder, a conical extruder or a kneader-type kneading machine and cutting the strands with a strand cutter.

Melt-molding of the thermoplastic polyester resin composition of the disclosure provides a film, a fiber or another molded article of any of various forms. A method employed for melt-molding may be, for example, injection molding, extrusion molding or blow molding. Injection molding is especially preferable as the method employed for melt-molding.

There are known methods of injection molding, for example, gas-assist molding, two-color molding, sandwich molding, in-mold molding, insert molding and injection press molding, in addition to the ordinary injection molding method. Any of these molding methods may be employed as the method of injection molding.

A molded article of the disclosure preferably has a tensile strength retention rate of not lower than 60% at each of temperatures that is measured with respect to a ⅛ inch (approximately 3.2 mm) test piece molded in conformity with ASTM D638 (in 2005) and that is determined according to an expression given below:

tensile strength retention rate (%)=(tensile strength after exposure in the atmosphere at temperature selected among 160° C., 170° C., 180° C. and 190° C. for 4000 hours)/(initial tensile strength)×100

The tensile strength herein denotes an ultimate tensile strength measured in conformity with ASTM D638 (in 2005). A molded article having the tensile strength retention rate of not lower than 60% at 160° C. in the above expression is preferable since it has good heat aging resistance. It is more preferable that the tensile strength retention rate is not lower than 60% at 170° C. It is furthermore preferable that the tensile strength retention rate is not lower than 60% at 180° C. It is further preferable that the tensile strength retention rate is not lower than 60% at 190° C.

The molded article of the disclosure may be used as any of machine mechanism components, electrical components, electronic components and automobile components by taking advantage of good long-term heat aging resistance, good mechanical properties such as tensile strength and high heat resistance. The molded article of the disclosure is especially useful for exterior parts, because of its good long-term heat aging resistance.

Concrete examples of the machine mechanism components, the electrical components, electronic component and automobile components include breakers, electromagnetic switches, focus casings, fly-back transformers, molded articles for fixing devices of copying machines and printers, housings of general household electric appliances, OA equipment and the like, variable condenser case components, various terminal plates, transformers, printed circuit boards, housings, terminal blocks, coil bobbins, connectors, relays, disk drive chasses, switch components, outlet components, motor components, sockets, plugs, capacitors, various cases, resistors, electrical and electronic components with metal terminals and conductive wires incorporated therein, computer-related components, sound components such as acoustic components, lighting components, telegraph equipment-related components, telephone equipment-related components, air conditioner components, components of household electric appliances such as VCRs and TV sets, components of copying machines, components of facsimile machines, components of optical devices, automobile ignition device components, automobile connectors and various automobile electrical components.

EXAMPLES

The following specifically describes advantageous effects of the thermoplastic polyester resin composition of the disclosure with reference to Examples. The raw materials used in Examples and Comparative Examples are given below. In the description below, % and parts respectively denote % by weight and parts by weight.
(A) Thermoplastic polyester resin:
<A-1> polybutylene terephthalate resin: A polybutylene terephthalate resin (melting point of 225° C.) manufactured by Toray Industries, Inc. was used.
<A-2> polyethylene terephthalate resin: A polyethylene terephthalate resin (melting point of 260° C.) manufactured by Toray Industries, Inc. was used.
(B) Multivalent hydroxyl compound having five or more hydroxyl groups:
<B-1> mannitol: D-mannitol (reagent) manufactured by Tokyo Chemical Industry Co., Ltd. was used.
<B-2> sorbitol: D-sorbitol (reagent) manufactured by Tokyo Chemical Industry Co., Ltd. was used.
<B-3> lactitol: Lactitol manufactured by B Food Science Co., Ltd. was used.
<B-4> inositol: "myo-inositol" manufactured by TSUNO FOOD INDUSTRIAL CO., LTD. was used.
<B-5> cyclodextrin: "Dexy Pearl" (registered trademark) 3-100 manufactured by ENSUIKO Sugar Refining Co., Ltd. was used.

<B-6> dipentaerythritol: Dipentaerythritol manufactured by KOEI CHEMICAL COMPANY, LIMITED was used.
(B') Multivalent hydroxyl compound other than (B) given above:
<B'-1> glycerol: Glycerol (reagent) manufactured by Tokyo Chemical Industry Co., Ltd. was used.
<B'-2> erythritol: Erythritol (reagent) manufactured by Tokyo Chemical Industry Co., Ltd. was used.
(C) Multifunctional epoxy compound:
<C-1> bisphenol A-type epoxy: "jER" (registered trademark) 1004K with an epoxy equivalent of 925 eq/t manufactured by Mitsubishi Chemical Corporation was used.
<C-2> novolac-type epoxy: XD1000 with an epoxy equivalent of 255 eq/t manufactured by Nippon Kayaku Co., Ltd. was used.
(D) Inorganic filler
<D-1> glass fiber: A chopped strand glass fiber 3J948 with a fiber diameter of approximately 10 m manufactured by Nitto Boseki Co., Ltd. was used.
<D-2> glass fiber: A chopped strand glass fiber ECS03T-253 with a fiber diameter of approximately 13 m manufactured by Nippon Electric Glass Co., Ltd. was used.
(E) Flame retardant
<E-1> halogen flame retardant: Tetrabromobisphenol A-epoxy polymer ECX-30 manufactured by DIC Corporation was used.
<E-2> halogen flame retardant: Pentabromobenzyl polyacrylate FR-1025 manufactured by ICL Japan Limited was used.
<E-3> halogen flame retardant: Bis(pentabromophenyl)ethane fire cut FCP-801 manufactured by SUZUHIRO CHEMICAL CO., LTD. was used.
<E-4> inorganic flame retardant: Antimony trioxide fire cut AT-3 manufactured by SUZUHIRO CHEMICAL CO., LTD. was used.
[Measurement Methods of Respective Properties]
The properties of Examples and Comparative Examples were evaluated by measurement methods described below.
1. Moldability (Gas Generation Amount)
Five grams of each resin composition were weighed in an aluminum dish. The aluminum dish with 5 grams of the resin composition was placed in a hot air oven in the atmosphere at 250° C. to be subjected to heat treatment for 1 hour. The weight of the resin composition after the heat treatment was measured, and a weight reduction ratio before and after the treatment was calculated as a gas generation amount.
2. Bleed-Out Resistance
Five grams of each resin composition were weighed in an aluminum dish. The aluminum dish with 5 grams of the resin composition was placed in a hot air oven in the atmosphere at 150° C. to be subjected to heat treatment for 24 hours. The weight of the resin composition after the heat treatment was measured and was then sequentially washed with 50 mL of chloroform and 50 mL of methanol. The weight of the resin composition after washing was measured, and a weight reduction ratio before and after washing was calculated as a bleed-out amount. The lower weight reduction ratio of the resin composition was regarded as the higher bleed-out resistance.
3. Mechanical Properties (Tensile Properties)
An ASTM No. 1 dumbbell evaluation test piece having the thickness of ⅛ inch (approximately 3.2 mm) was obtained under the following injection molding conditions using an injection molding machine IS55EPN manufactured by TOSHIBA MACHINE CO., LTD. More specifically, when the polybutylene terephthalate resin was used as the component (A), the evaluation test piece was obtained under the temperature conditions of the molding temperature of 250° C. and the mold temperature of 80° C. and under the molding cycle conditions of the sum of the injection time and the pressure-keeping time of 10 seconds and the cooling time of 10 seconds. When the polyethylene terephthalate resin was used as the component (A), the evaluation test piece was obtained under the temperature conditions of the molding temperature of 285° C. and the mold temperature of 80° C. and under the molding cycle conditions of the sum of the injection time and the pressure-keeping time of 10 seconds and the cooling time of 10 seconds. The ultimate tensile strength (tensile strength) and the ultimate tensile elongation (tensile elongation) were measured in conformity with ASTM D638 (in 2005) with respect to each of the obtained tensile properties evaluation test pieces. The tensile strength and the tensile elongation were respectively given as average values of three measurement values. The material having the higher tensile strength and the greater tensile elongation was regarded as the material having the better toughness.

4. Heat Aging Resistance

An ASTM No. 1 dumbbell evaluation test piece having the thickness of ⅛ inch (approximately 3.2 mm) was obtained under the same injection molding conditions as those for the tensile properties in above Section 3. using an injection molding machine IS55EPN manufactured by TOSHIBA MACHINE CO., LTD. Each of the obtained evaluation test pieces was placed in a hot air oven in the atmosphere at 160° C. and at 190° C. to be subjected to heat treatment for 4000 hours. The ultimate tensile strength (tensile strength) and the ultimate tensile elongation (tensile elongation) were measured in conformity with ASTM D638 (in 2005) like above Section 3. with respect to each of the obtained tensile properties evaluation test pieces after the heat treatment. The tensile strength and the tensile elongation were respectively given as average values of three measurement values. A tensile strength retention rate was calculated according to Expression given below using the ultimate tensile strength of the evaluation test piece after the heat treatment. The higher tensile strength retention rate was regarded as the better heat aging resistance. Especially the tensile strength retention rate of not lower than 60% was regarded as specifically excellent heat aging resistance. The maximum tensile strength retention rate is 100%.

tensile strength retention rate (%)=ultimate tensile strength of evaluation test piece after heat treatment/ultimate tensile strength of evaluation test piece before heat treatment×100

5. Dimensional Stability

A square plate of 80 mm in length×80 mm in width×3 mm in thickness for dimensional stability evaluation was obtained under the same injection molding conditions as those for the tensile properties in above Section 3. using an injection molding machine IS55EPN manufactured by TOSHIBA MACHINE CO., LTD.

The dimensions of each of the evaluation square plates in a flow direction (MD) and in an orthogonal direction (TD) of the molten resin were measured by using a profile projector V20B manufactured by NIKON CORPORATION. A TD molding shrinking factor (average length of test piece along TD direction/dimension of mold in TD direction) and an MD molding shrinking factor (average length of test piece along MD direction/dimension of mold in MD direction) were determined. A molding shrinking factor difference (Δ(TD-MD)) was calculated according to Expression given below. The lower molding shrinking factor difference was regarded as the better dimensional stability. Especially the molding shrinking factor difference of not higher than 1.0 was regarded as the specifically excellent dimensional stability.

molding shrinking factor difference(Δ(TD-MD))=TD molding shrinking factor-MD molding shrinking factor 6. Flame Retardance A square plate of 125 mm in length×13 mm in width×1.6 mm in thickness for flame retardance evaluation was obtained under the same injection molding conditions as those for the tensile properties in above Section 3. using an injection molding machine IS55EPN manufactured by TOSHIBA MACHINE CO., LTD. The flame retardance was evaluated according to the evaluation criteria specified in UL94 vertical flame test with respect to each of the obtained combustion test pieces. The flame retardance was evaluated by the ranks decreasing in the sequence of V-0>V-1>V-2>HB. The material that had the poor combustibility and did not reach the above flame retardance rank V-2 was evaluated as below the standard.

Examples 1 to 21, Comparative Examples 1 to 4

The polybutylene terephthalate resin (A-1), the multivalent hydroxyl compound (B) having five or more hydroxyl groups or the multivalent hydroxyl compound (B') other than (B), and the multifunctional epoxy compound (C) were blended at respective compositions shown in Tables 1 to 3 and Table 5 using a unidirectionally rotating twin screw extruder with a vent (TEX-30α manufactured by The Japan Steel Works, Ltd.) having the screw diameter of 30 mm, the kneading zone rate of 20% and L/D=35, and the mixture was fed from a breech-loading part of the twin screw extruder. The mixture was melt-blended under the extrusion conditions of the kneading temperature of 250° C. and the screw rotation speed of 150 rpm, and a resin composition obtained was ejected into strands. The ejected resin composition passed through a cooling bath and was pelletized with a strand cutter.

The obtained pellets in each of Examples 1 to 14 were dried with a hot air drier at the temperature of 110° C. for 12 hours and were then evaluated by the methods described in the above Sections 1. to 5. The obtained pellets in each of Examples 15 to 21 were dried with a hot air drier at the temperature of 110° C. for 12 hours and were then evaluated by the methods described in the above Sections 1. to 6. The obtained pellets in each of Comparative Examples 1 to 4 were dried with a hot air drier at the temperature of 110° C. for 12 hours and were then evaluated by the methods described in the above Sections 1. to 5.

Example 22

The polyethylene terephthalate resin (A-2), the multivalent hydroxyl compound (B) having five or more hydroxyl groups and the multifunctional epoxy compound (C) were blended at a composition shown in Table 4 using a unidirectionally rotating twin screw extruder with a vent (TEX-30a manufactured by The Japan Steel Works, Ltd.) having the screw diameter of 30 mm, the kneading zone rate of 20% and L/D=35, and the mixture was fed from a breech-loading part of the twin screw extruder. The mixture was melt-blended under the extrusion conditions of the kneading temperature of 280° C. and the screw rotation speed of 150 rpm, and a resin composition obtained was ejected into strands. The ejected resin composition passed through a cooling bath and was pelletized with a strand cutter.

The obtained pellets were dried with a hot air drier at the temperature of 150° C. for 3 hours and were then evaluated by the methods described in the above Sections 1. to 6.

Examples 23, 24 and 25 and Comparative Examples 5 to 7

The polybutylene terephthalate resin (A-1), the multivalent hydroxyl compound (B) having five or more hydroxyl groups or the multivalent hydroxyl compound (B') other than (B), and the multifunctional epoxy compound (C) were blended at respective compositions shown in Tables 4 and 5 using a unidirectionally rotating twin screw extruder with a vent (TEX-30α manufactured by The Japan Steel Works, Ltd.) having the screw diameter of 30 mm, the kneading zone rate of 20% and L/D=35, and the mixture was fed from a breech-loading part of the twin screw extruder. The inorganic filler (D) was added at the respective compositions shown in Tables 4 and 5 from a side feeder between the breech-loading part and the vent. The mixture was melt-blended under the extrusion conditions of the kneading temperature of 250° C. and the screw rotation speed of 150 rpm, and a resin composition obtained was ejected into strands. The ejected resin composition passed through a cooling bath and was pelletized with a strand cutter.

The obtained pellets in each of Examples 23, 24 and 25 were dried with a hot air drier at the temperature of 110° C. for 6 hours and were then evaluated by the methods described in the above Sections 1. to 6. The obtained pellets in each of Comparative Examples 5 to 7 were dried with a hot air drier at the temperature of 110° C. for 6 hours and were then evaluated by the methods described in the above Sections 1. to 5.

Examples 26, 27 and 28

The polybutylene terephthalate resin (A-1), the multivalent hydroxyl compound (B) having five or more hydroxyl groups, the multifunctional epoxy compound (C) and the flame retardant (E) were blended at respective compositions shown in Table 4 using a unidirectionally rotating twin screw extruder with a vent (TEX-30a manufactured by The Japan Steel Works, Ltd.) having the screw diameter of 30 mm, the kneading zone rate of 20% and L/D=35, and the mixture was fed from a breech-loading part of the twin screw extruder. The inorganic filler (D) was added at the respective compositions shown in Table 4 from a side feeder between the breech-loading part and the vent. The mixture was melt-blended under the extrusion conditions of the kneading temperature of 250° C. and the screw rotation speed of 150 rpm, and a resin composition obtained was ejected into strands. The ejected resin composition passed through a cooling bath and was pelletized with a strand cutter.

The obtained pellets were dried with a hot air drier at the temperature of 110° C. for 12 hours and were then evaluated by the methods described in the above Sections 1. to 6.

Results of the evaluation of the respective Examples and Comparative Examples are shown in Tables 1 to 5.

TABLE 1

| | | | EX 1 | EX 2 | EX 3 | EX 4 | EX 5 | EX 6 | EX 7 |
|---|---|---|---|---|---|---|---|---|---|
| Thermoplastic polyester resin (A) | A-1 | parts by weight | 100 | 100 | 100 | 100 | 100 | 100 | 100 |
| | A-2 | | | | | | | | |
| Multivalent hydroxyl compound (B) having five or more hydroxyl groups | B-1 | parts by weight | 0.1 | 0.5 | 1 | 2 | 3 | 0.5 | 1 |
| | B-2 | | | | | | | | |
| | B-3 | | | | | | | | |
| | B-4 | | | | | | | | |
| | B-6 | | | | | | | | |
| Multifunctional epoxy compound (C) | C-1 | parts by weight | 0.5 | 0.5 | 0.5 | 0.5 | 0.5 | 1 | 1 |
| | C-2 | | | | | | | | |
| Inorganic filler (D) | D-1 | parts by weight | | | | | | | |
| Component (B)/compound (C) composition ratio | | | 0.2 | 1 | 2 | 4 | 6 | 0.5 | 1 |
| Moldability | Gas generation amount | wt % | 0.4 | 0.5 | 0.7 | 0.8 | 0.9 | 0.4 | 0.5 |
| Bleed-out resistance | Bleed-out amount | wt % | 0.01 | 0.02 | 0.03 | 0.04 | 0.05 | 0.01 | 0.02 |
| Mechanical properties | Tensile strength | MPa | 58 | 58 | 57 | 56 | 56 | 58 | 57 |
| | Tensile elongation | % | 35 | 30 | 27 | 24 | 20 | 32 | 26 |
| Heat aging resistance 160° C. × 4000 hours | Tensile strength retention rate after treatment | % | 45 | 58 | 75 | 81 | 85 | 55 | 78 |
| Dimensional stability | Molding shrinking factor difference Δ (TD − MD) | — | 0.8 | 0.6 | 0.4 | 0.3 | 0.3 | 0.7 | 0.5 |

TABLE 2

| | | | EX 8 | EX 9 | EX 10 | EX 11 | EX 12 | EX 13 | EX 14 |
|---|---|---|---|---|---|---|---|---|---|
| Thermoplastic polyester resin (A) | A-1 | parts by weight | 100 | 100 | 100 | 100 | 100 | 100 | 100 |
| | A-2 | | | | | | | | |
| Multivalent hydroxyl compound (B) having five or more hydroxyl groups | B-1 | parts by weight | 3 | 5 | 7 | 1 | 2 | 3 | 5 |
| | B-2 | | | | | | | | |
| | B-3 | | | | | | | | |
| | B-4 | | | | | | | | |
| | B-5 | | | | | | | | |
| Multifunctional epoxy compound (C) | C-1 | parts by weight | 1 | 1 | 1 | 2 | 2 | 2 | 2 |
| | C-2 | | | | | | | | |
| Inorganic filler (D) | D-1 | parts by weight | | | | | | | |

TABLE 2-continued

|  |  |  | EX 8 | EX 9 | EX 10 | EX 11 | EX 12 | EX 13 | EX 14 |
|---|---|---|---|---|---|---|---|---|---|
| Component (B)/compound (C) composition ratio |  |  | 3 | 5 | 7 | 0.5 | 1 | 1.5 | 2.5 |
| Moldability | Gas generation amount | wt % | 0.7 | 0.9 | 1.4 | 0.5 | 0.5 | 0.6 | 0.8 |
| Bleed-out resistance | Bleed-out amount | wt % | 0.03 | 0.04 | 0.05 | 0.02 | 0.03 | 0.03 | 0.04 |
| Mechanical properties | Tensile strength | MPa | 56 | 54 | 49 | 57 | 56 | 55 | 53 |
|  | Tensile elongation | % | 20 | 17 | 12 | 25 | 22 | 19 | 16 |
| Heat aging resistance 160° C. × 4000 hours | Tensile strength retention rate after treatment | % | 87 | 84 | 81 | 49 | 78 | 82 | 80 |
| Dimensional stability | Molding shrinking factor difference Δ (TD − MD) | — | 0.4 | 0.3 | 0.6 | 0.5 | 0.3 | 0.3 | 0.4 |

TABLE 3

|  |  |  | EX 15 | EX 16 | EX 17 | EX 18 | EX 19 | EX 20 | EX 21 |
|---|---|---|---|---|---|---|---|---|---|
| Thermoplastic polyester resin (A) | A-1 | parts by weight | 100 | 100 | 100 | 100 | 100 | 100 | 100 |
|  | A-2 |  |  |  |  |  |  |  |  |
| Multivalent hydroxyl compound (B) having five or more hydroxyl groups | B-1 | parts by weight |  |  |  |  |  | 3 |  |
|  | B-2 |  | 3 |  |  |  |  |  | 3 |
|  | B-3 |  |  | 3 |  |  |  |  |  |
|  | B-4 |  |  |  | 3 |  |  |  |  |
|  | B-6 |  |  |  |  | 3 |  |  |  |
|  | B-6 |  |  |  |  |  | 3 |  |  |
| Multifunctional epoxy compound (C) | C-1 | parts by weight | 1 | 1 | 1 | 1 | 1 |  |  |
|  | C-2 |  |  |  |  |  |  | 1 | 1 |
| Inorganic filler (D) | D-1 | parts by weight |  |  |  |  |  |  |  |
|  | D-2 |  |  |  |  |  |  |  |  |
| Flame retardant (E) | E-1 | parts by weight |  |  |  |  |  |  |  |
|  | E-2 |  |  |  |  |  |  |  |  |
|  | E-3 |  |  |  |  |  |  |  |  |
|  | E-4 |  |  |  |  |  |  |  |  |
| Component (B)/compound (C) composition ratio |  |  | 3 | 3 | 3 | 3 | 3 | 3 | 3 |
| Moldability | Gas generation amount | wt % | 0.7 | 0.6 | 0.5 | 0.6 | 0.6 | 0.7 | 0.8 |
| Bleed-out resistance | Bleed-out amount | wt % | 0.03 | 0.03 | 0.03 | 0.02 | 0.05 | 0.03 | 0.03 |
| Mechanical properties | Tensile strength | MPa | 53 | 51 | 52 | 52 | 51 | 53 | 53 |
|  | Tensile elongation | % | 20 | 18 | 18 | 17 | 16 | 21 | 20 |
| Heat aging resistance 160° C. × 4000 hours | Tensile strength retention rate after treatment | % | 85 | 83 | 88 | 81 | 75 | 88 | 86 |
| Heat aging resistance 190° C. × 4000 hours | Tensile strength retention rate after treatment | % | 15 | 12 | 10 | 11 | 5 | 15 | 14 |
| Dimensional stability | Molding shrinking factor difference Δ (TD − MD) | — | 0.5 | 0.5 | 0.5 | 0.6 | 0.7 | 0.3 | 0.3 |
| Flame retardance | UL94 | — | HB | HB | HB | HB | HB | HB | HB |

TABLE 4

|  |  |  | EX 22 | EX 23 | EX 24 | EX 25 | EX 26 | EX 27 | EX 28 |
|---|---|---|---|---|---|---|---|---|---|
| Thermoplastic polyester resin (A) | A-1 | parts by weight |  | 100 | 100 | 100 | 100 | 100 | 100 |
|  | A-2 |  | 100 |  |  |  |  |  |  |
| Multivalent hydroxyl compound (B) having five or more hydroxyl groups | B-1 | parts by weight | 3 | 3 | 3 | 3 | 3 | 3 | 3 |
|  | B-2 |  |  |  |  |  |  |  |  |
|  | B-3 |  |  |  |  |  |  |  |  |
|  | B-4 |  |  |  |  |  |  |  |  |
|  | B-5 |  |  |  |  |  |  |  |  |
|  | B-6 |  |  |  |  |  |  |  |  |
| Multifunctional epoxy compound (C) | C-1 | parts by weight | 1 | 1 |  |  | 1 | 1 | 1 |
|  | C-2 |  |  |  | 1 | 1 |  |  |  |
| Inorganic filler (D) | D-1 | parts by weight |  | 43 | 43 |  | 43 | 43 | 43 |
|  | D-2 |  |  |  |  | 43 |  |  |  |
| Flame retardant (E) | E-1 | parts by weight |  |  |  |  | 26 |  |  |
|  | E-2 |  |  |  |  |  |  | 26 |  |
|  | E-3 |  |  |  |  |  |  |  | 26 |
|  | E-4 |  |  |  |  |  | 9 | 9 | 9 |
| Component (B)/compound (C) composition ratio |  |  | 3 | 3 | 3 | 3 | 3 | 3 | 3 |
| Moldability | Gas generation amount | wt % | 1.1 | 0.5 | 0.5 | 0.5 | 0.6 | 0.6 | 0.6 |
| Bleed-out resistance | Bleed-out amount | wt % | 0.03 | 0.02 | 0.02 | 0.02 | 0.03 | 0.03 | 0.04 |

TABLE 4-continued

|  |  |  | EX 22 | EX 23 | EX 24 | EX 25 | EX 26 | EX 27 | EX 28 |
|---|---|---|---|---|---|---|---|---|---|
| Mechanical properties | Tensile strength | MPa | 57 | 141 | 140 | 131 | 135 | 141 | 145 |
|  | Tensile elongation | % | 14 | 3.5 | 3.4 | 3.2 | 3.3 | 3.5 | 3.7 |
| Heat aging resistance 160° C. × 4000 hours | Tensile strength retention rate after treatment | % | 80 | 95 | 94 | 95 | 95 | 96 | 98 |
| Heat aging resistance 190° C. × 4000 hours | Tensile strength retention rate after treatment | % | 13 | 36 | 39 | 48 | 67 | 65 | 64 |
| Dimensional stability | Molding shrinking factor difference Δ (TD − MD) | — | 0.3 | 0.9 | 0.9 | 0.8 | 0.7 | 0.7 | 0.7 |
| Flame retardance | UL94 | — | HB | HB | HB | HB | V-0 | V-0 | V-0 |

TABLE 5

|  |  |  | COMP EX 1 | COMP EX 2 | COMP EX 3 | COMP EX 4 | COMP EX 5 | COMP EX 6 | COMP EX 7 |
|---|---|---|---|---|---|---|---|---|---|
| Thermoplastic polyester resin (A) | A-1 | parts by weight | 100 | 100 | 100 | 100 | 100 | 100 | 100 |
|  | A-2 |  |  |  |  |  |  |  |  |
| Multivalent hydroxyl compound (B) having five or more hydroxyl groups | B-1 | parts by weight |  |  | 3 |  | 3 |  |  |
|  | B-2 |  |  |  |  |  |  |  |  |
|  | B-3 |  |  |  |  |  |  |  |  |
|  | B-4 |  |  |  |  |  |  |  |  |
|  | B-5 |  |  |  |  |  |  |  |  |
| Multivalent hydroxyl compound other than component (B) | B'-1 |  | 3 |  |  |  |  | 3 |  |
|  | B'-2 |  |  | 3 |  |  |  |  | 3 |
| Multifunctional epoxy compound (C) | C-1 | parts by weight | 1 | 1 |  | 1 |  |  | 1 |
|  | C-2 |  |  |  |  |  |  |  |  |
| Inorganic filler (D) | D-1 | parts by weight |  |  |  |  | 43 | 43 | 43 |
| Component (B) or component (B)'/compound (C) composition ratio |  |  | 3 | 3 | 0 | 0 | 0 | 0 | 3 |
| Moldability | Gas generation amount | wt % | 1.2 | 1.3 | 1.0 | 0.5 | 1.0 | 0.9 | 1.1 |
| Bleed-out resistance | Bleed-out amount | wt % | 0.13 | 0.12 | 0.11 | 0.01 | 0.10 | 0.14 | 0.18 |
| Mechanical properties | Tensile strength | MPa | 51 | 49 | 52 | 53 | 138 | 136 | 124 |
|  | Tensile elongation | % | 17 | 16 | 22 | 30 | 2.4 | 2.1 | 2.4 |
| Heat aging resistance 160° C. × 4000 hours | Tensile strength retention rate after treatment | % | 35 | 38 | 51 | 32 | 58 | 71 | 67 |
| Dimensional stability | Molding shrinking factor difference Δ (TD − MD) | — | 1.4 | 1.5 | 1.3 | 1.2 | 1.5 | 1.7 | 1.5 |

Comparison between Examples 1 to 22 and Comparative Examples 1 to 4 and comparison between Examples 23 to 25 and Comparative Examples 5 to 7 show that blending a specified amount of the component (B) and a specified amount of the component (C) with the component (A) provides a material having good balance of moldability, bleed-out resistance, mechanical properties, heat aging resistance and dimensional stability.

Comparison between Examples 2 to 4 and Examples 1 and 5, comparison between Examples 7 to 9 and Examples 6 and 10 and comparison between Examples 12 to 14 and Example 11 show that the ratio of the parts by weight of the component (B) to the parts by weight of the component (C) ((parts by weight of the multivalent hydroxyl compound (B) having five or more hydroxyl groups relative to 100 parts by weight of the thermoplastic polyester resin (A))/(parts by weight of the multifunctional epoxy group (C) relative to 100 parts by weight of the thermoplastic polyester resin (A))) of 1 to 5 provides a material having better balance of moldability, bleed-out resistance, mechanical properties, heat aging resistance and dimensional stability.

Comparison between Examples 8 and 15 to 18 and Example 19 shows that using at least one or more selected among the sugar alcohols, the cyclitols, the monosaccharides, the disaccharides and the oligosaccharides as the component (B) provides a material having better balance of moldability, bleed-out resistance, mechanical properties, heat aging resistance and dimensional stability.

Comparison between Examples 8 and 15 to 17 and Examples 18 and 19 shows that using at least one or more selected among mannitol, sorbitol, maltitol, lactitol, inositol, oligotose and isomalt as the component (B) provides a material having better balance of moldability, bleed-out resistance, mechanical properties, heat aging resistance and dimensional stability.

Comparison between Examples 8 and 15 and Examples 16 to 19 shows that using at least one or more selected among mannitol and/or sorbitol as the component (B) provides a material having better balance of moldability, bleed-out resistance, mechanical properties, heat aging resistance and dimensional stability.

Comparison between Examples 8, 20 and 21 and Comparative Example 3 shows that using a bisphenol-type epoxy compound and/or a novolac-type epoxy compound as the component (C) provides a material having good balance of moldability, bleed-out resistance and heat aging resistance.

Comparison between Examples 23, 24 and 25 and Examples 8 and 20 shows that further adding a specified amount of the component (D) to the component (A) provides a material having better balance of mechanical properties and heat aging resistance.

Comparison between Examples 26 to 28 and Example 23 shows that further adding a specified amount of the component (E) to the component (A) provides a material having better heat aging resistance and flame retardance.

Comparison between Example 8 and Example 22 shows that using the polybutylene terephthalate resin as the component (A) provides a material having better balance of mechanical properties and heat aging resistance.

The invention claimed is:

1. A thermoplastic polyester resin composition, comprising:
   a thermoplastic polyester resin (A);
   a multivalent hydroxyl compound (B) having five or more hydroxyl groups in an amount of 0.1 to 10 parts by weight relative to 100 parts by weight of (A); and
   a multifunctional epoxy compound (C) in an amount of 0.1 to 10 parts by weight relative to 100 parts by weight of (A),
   wherein the thermoplastic polyester resin (A) is at least one member selected from the group consisting of polyethylene terephthalate, polypropylene terephthalate, polybutylene terephthalate, polybutylene isophthalate/terephthalate copolymer, polybutylene terephthalate/decanedicarboxylate copolymer and polybutylene terephthalate/polytetramethylene glycol copolymer, and
   wherein the thermoplastic polyester resin composition satisfies (i) and (ii) below:
   (i) a ratio of parts by weight of the multivalent hydroxyl compound (B) having five or more hydroxyl groups to parts by weight of the multifunctional epoxy compound (C) ((parts by weight of the multivalent hydroxyl compound (B) having five or more hydroxyl groups relative to 100 parts by weight of (A))/(parts by weight of the multifunctional epoxy group (C) relative to 100 parts by weight of (A))) is 2 to 5; and
   (ii) upon being molded, the thermoplastic polyester resin composition has a retention rate of tensile strength of not lower than 60%, wherein the tensile strength is measured with respect to a ⅛ inch (approximately 3.2 mm) test piece molded in conformity with ASTM D638 (in 2005) and is determined according to the expression given below:

(tensile strength after exposure in the atmosphere at temperature of 160° C. for 4000 hours)/(initial tensile strength)×100.

2. The thermoplastic polyester resin composition according to claim 1, wherein the multivalent hydroxyl compound (B) having five or more hydroxyl groups is at least one member selected from a sugar alcohol, cyclitol, monosaccharide, disaccharide or oligosaccharide.

3. The thermoplastic polyester resin composition according to claim 1, wherein the multivalent hydroxyl compound (B) having five or more hydroxyl groups is at least one member selected from mannitol, sorbitol, maltitol, lactitol, inositol, oligotose or isomalt.

4. The thermoplastic polyester resin composition according to claim 1, wherein the multivalent hydroxyl compound (B) having five or more hydroxyl groups is mannitol and/or sorbitol.

5. The thermoplastic polyester resin composition according to claim 1, wherein the multifunctional epoxy compound (C) is a bisphenol-type epoxy compound and/or a novolac-type epoxy compound.

6. The thermoplastic polyester resin composition according to claim 1, further comprising:
   1 to 100 parts by weight of an inorganic filler (D) relative to 100 parts by weight of the thermoplastic polyester resin (A).

7. The thermoplastic polyester resin composition according to claim 1, further comprising:
   1 to 50 parts by weight of a flame retardant (E) relative to 100 parts by weight of the thermoplastic polyester resin (A).

8. The thermoplastic polyester resin composition according to claim 7, wherein the flame retardant (E) is a halogen flame retardant.

9. The thermoplastic polyester resin composition according to claim 1, wherein the thermoplastic polyester resin (A) is a polybutylene terephthalate resin.

10. A molded article produced from the thermoplastic polyester resin composition according to claim 1.

11. The molded article according to claim 10,
    wherein a retention rate of tensile strength that is measured with respect to a ⅛ inch (approximately 3.2 mm) of a test piece molded in conformity with ASTM D638 (in 2005) and that is determined according to an expression given below is not lower than 60%:

(tensile strength after exposure in the atmosphere at temperature of 190° C. for 4000 hours)/(initial tensile strength)×100.

* * * * *